United States Patent [19]
Wrenn, Jr.

[11] 3,785,164
[45] Jan. 15, 1974

[54] PRECHARGED RECEIVER DRIER FOR AUTOMOBILE AIR CONDITIONING SYSTEMS

[75] Inventor: George T. Wrenn, Jr., Crittenden, Va.

[73] Assignee: Virginia Chemicals Inc., Portsmouth, Va.

[22] Filed: May 17, 1972

[21] Appl. No.: 254,287

[52] U.S. Cl. .................. 62/129, 62/292, 62/474, 62/509, 62/298
[51] Int. Cl. .................................................. F25b 43/00
[58] Field of Search .................. 62/292, 474, 509, 62/85, 129, 298; 210/131, 232, 235

[56] References Cited
UNITED STATES PATENTS
2,758,719  8/1956  Line ........................................ 62/474
3,572,050  3/1971  Bottum .................................... 62/474

FOREIGN PATENTS OR APPLICATIONS
1,121,087  1/1962  Germany .............................. 210/235

Primary Examiner—Meyer Perlin

[57] ABSTRACT

A precharged receiver drier unit for automobile air conditioning systems, including a molecular seive and an axially reciprocable valve fitting for connection to the automobile refrigerant system. The valve fitting seals the refrigerant system in one attitude as the spent receiver drier is removed and opens the refrigerant system in another attitude, as the fresh receiver drier is threadedly attached to the valve fitting.

8 Claims, 3 Drawing Figures

PATENTED JAN 15 1974

PRECHARGED RECEIVER DRIER FOR AUTOMOBILE AIR CONDITIONING SYSTEMS

BACKGROUND OF THE INVENTION

1. Field of the Invention

Refrigerant systems, particularly relatively miniaturized automobile refrigerant systems characterized in their relatively confined array and difficult accessibility for recharging with refrigerant. Conventionally, the automotive refrigerant system is vented when it is to be recharged. This venting of the system to the atmosphere has obvious deleterious effects. Also, the attempted recharge is required to be metered from a master container with relative inaccuracy.

2. Description of the Prior Art

Small U.S. Pat. No. 3,118,288

Small is an earlier attempt to avoid complete venting of the automotive refrigerant system to the atmosphere prior to recharging. According to Small, the precharged unit has a frangible diaphragm which is punctured, as the housing embodying the refrigerant charge and drier material is fitted onto the system. The diaphragm provides somewhat less than a satisfactory seal between the receiver drier unit and the refrigerant system and, of course, prevents the unit from being reused or recharged.

SUMMARY OF THE INVENTION

According to the present invention, the receiver drier unit is self-contained so as to embody a top connector fitting port, an axially reciprocable induction tube, a molecular seive, and suitable seals adjacent the connector port and the bottom end of the induction tube. A valve connector fitted to the automobile refrigerant system embodies a valve plunger with seals sufficient to close the inlet and outlet port in the automobile permanent system. The valve plunger is coaxially aligned with the induction tube in the receiver drier unit, such that screwing or threading of the receiver drier assembly into the valve connector compresses the valve plunger and induction tube, opening the automobile system inlet and outlet ports, as well as the receiver drier seals, so as to recharge and dry the system.

DESCRIPTION OF THE PREFERRED EMBODIMENTS

Figure 1:
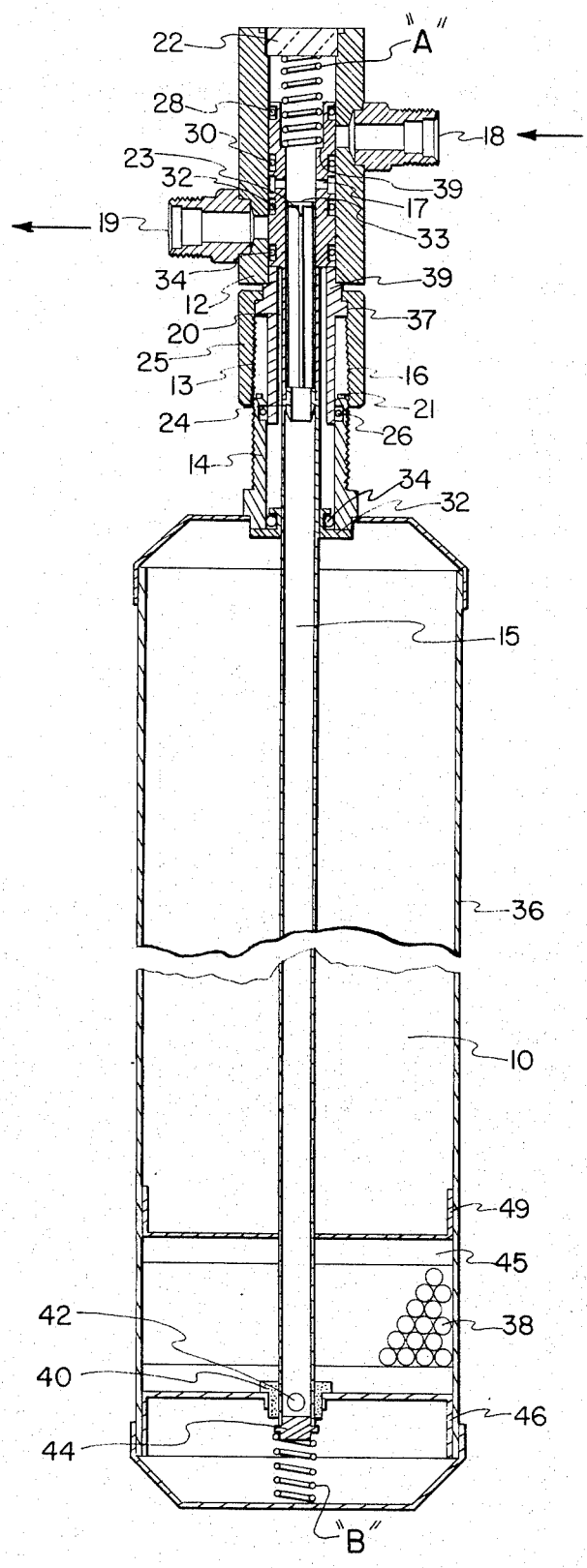
FIG. 1 is a vertical section of the proposed receiver drier housing and valve connector fitting with inlet and outlet ports communicating with the automobile refrigerant system and showing the receiver drier assembly threadedly fitted to the valve connector with inlet and outlet ports sealed closed, prior to recharge.

In FIG. 1 there is illustrated a precharged receiver drier housing assembly 10, including housing 36 and valve connector port with exterior threads 14. An induction tube 15 open centrally at its top and vertically at its bottom as at 42 embodies a flanged support 32 affixed to its top neck with an O-ring seal 34. A bottom seat 44 abuts compression spring B, as the bottom end extends through grommet-like seal 40. The connector port 14 may have an inner O-ring seal 26 at its top.

Valve connector 12 is threadedly engageable with connector port 14 by means of swivel nut 25, having interior threads 13. Swivel nut 25 at its top engages shoulder 37 on plunger bottom support piece 39, axially advancing the valve connector housing and induction tube, so as to open valve inlet 19 and valve outlet 18 with respect to the plunger valve 16.

Figure 2:
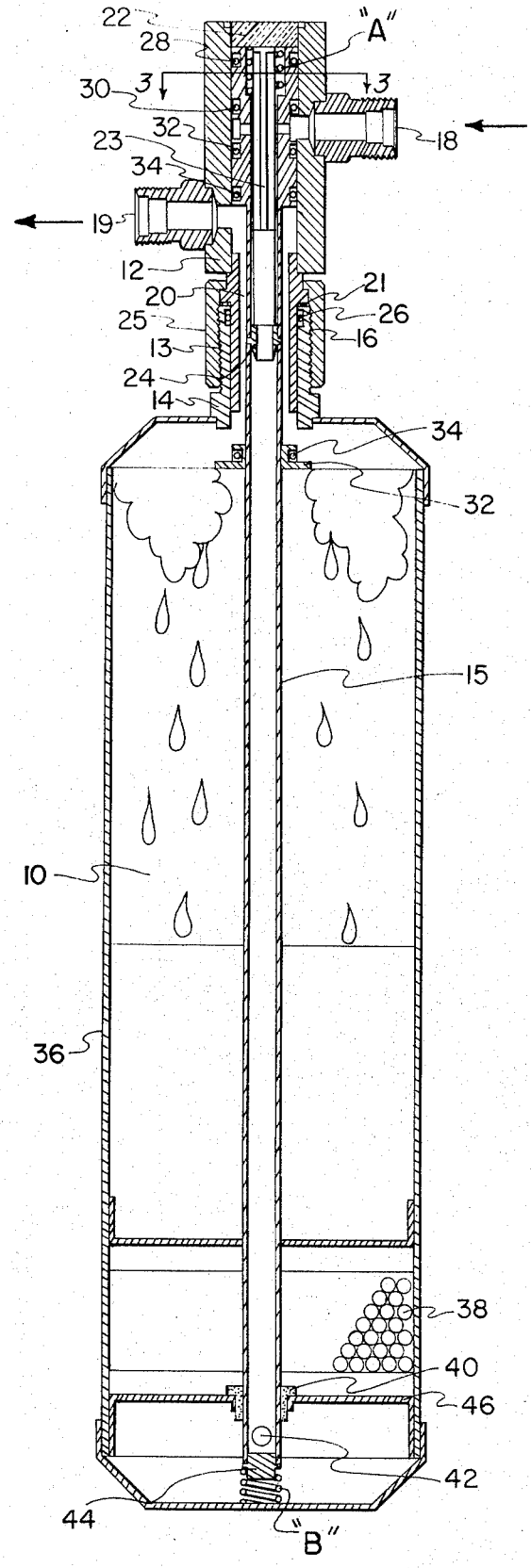
FIG. 2 is a similar vertical section, showing the inlet and outlet ports opened upon full threaded engagement of the connector fitting with the valve connector port, so as to axially reciprocate the plunger valve and induction tube, opening the automotive refrigerant system to the receiver drier housing.
Figure 3:
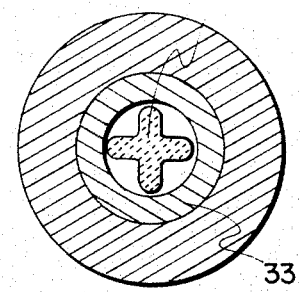
FIG. 3 is a transverse section taken along section line 3—3, showing the moisture indicator float assembly supported coaxially within the plunger valve.

Plunger valve generally designated as 16 has a lateral vent 17 registrable with outlet 18, as the assembly is compressed and as illustrated in FIG. 2. At this time, channel 20 in the valve connector housing communicates with inlet 19 permitting the opening of the system, also as illustrated FIG. 2. Refrigerant flowing through the molecular seive 38 supported intermediate upper and lower screens 45 and 47 with associated screen support brackets 46 and 49, vents through lower port 42 upwardly through the induction tube 15, thence through plunger 16 and outwardly via port 17 and 18. The plunger valve 16 may have an axially positioned float 23 with a moisture indicator positioned at its top 33 and retained within the plunger by means of bottom retainer piece 24. In FIG. 2 float 23 is shown positioned immediately beneath sight glass 22. Also, the plunger valve 16 may have O-ring seals 28 and 30 positionable adjacent outlet 18 and O-ring seals 32 and 34 positionable adjacent inlet 19, as illustrated in FIG. 1. Top spring A is seated upon inner shoulder 39 within the top of plunger valve 16.

The device functions as follows: The precharged receiver drier assembly 10 is engaged with valve connector 12 at threads 13. As swivel nut 25 is screwed onto connector 14 of the receiver drier assembly, the valve body mades a leaktight seal in the connector as it slides in contact with O-ring 26. The induction tube 15 engages the plunger valve 16 and pushes it up through stroke A, compressing spring A. (Spring A has less than 50 percent of the force exerted by spring B at the bottom of the receiver drier assembly).

After the plunger 16 has risen through stroke A port 17 is aligned with outlet 18 and inlet 19 is opened to channel 29 in the lower part of the valve connector. After the plunger valve 16 has reached the limit of its upward stroke, and as the swivel nut 25 is screwed further onto threads 13, spring B at the bottom of the receiver drier assembly yields and seal 40 and seal 34 inside the receiver drier assembly open as stroke B is accomplished. Finally, the swivel nut 25 is tightened against gasket 21, completing a secondary seal of the receiver drier assembly to the valve connector.

Another feature of the invention is a sight glass 22 glued into the top of the valve connector through which one may view the flow of refrigerant. There is also a float 23 with a colored moisture sensitive tip 33 that will rise against sight glass 22 when liquid refrigerant is available and which will change color if excess moisture is present in the system. Retainer 24 prevents float 23 from dropping out of the plunger valve 16.

I claim:

1. A precharged receiver drier of the type adapted for fitting in automobile air conditioning systems comprising:

A. a receiver drier housing (10) embodying:

i. a connector fitting port (14);
   ii. a seive (38) medially positioned within said housing;
   iii. an induction tube (15) extending co-axially through said connector fitting port and said seive, said tube at its bottom opening into said housing;
   iv. a bottom compression means (B) supported intermediate the bottom of said induction tube and said housing bottom; and
   v. a first sealing means (34) positioned upon said induction tube so as to seal said connector fitting port and a second sealing means (40) independently mounted in said housing, so as to seal the bottom of said induction tube.
  B. A valve connector (12) having an axial core and threadedly engaging said connector fitting port and further including:
   i. superposed inlet (19) and outlet (18) ports communicating with said axial core;
   ii. a plunger valve (16) positioned in said core, so as to be axially aligned with said induction tube, said plunger being axially reciprocable to open said ports with respect to said induction tube and said receiver drier housing and having an outlet seal encircling said plunger and engaging the interior wall of said core adjacent said outlet port and an inlet seal encircling said plunger and engaging the interior wall of said core adjacent said inlet port;
   iii. an axial float (23) reciprocably mounted within said plunger valve; and
   iv. a top compression means (A) intermediate said plunger top and the top of said connector.
  C. A refrigerant seive (45, 47) mounted in said housing above said second seal and said bottom compression means and including an associated screen.

2. A precharged receiver drier of the type adapted for fitting in automobile air conditioning systems as in claim 1, said outlet seal including a pair of axially spaced O-rings positionable on either side of said outlet upon axial reciprocation of said plunger and said inlet seal including a pair of O-rings positionable on either side of said inlet upon axial reciprocation of said plunger.

3. A precharged receiver drier of the type adapted for fitting in automobile air conditioning systems as in claim 2, said plunger including an inner, axial core extending into said induction tube and having a lateral port registrable with said outlet port.

4. A precharged receiver drier of the type adapted for fitting in automobile air conditioning systems as in claim 3, said plunger having a reduced diameter lower portion registrable with said inlet port.

5. A precharged receiver drier of the type adapted for fitting in automobile air conditioning systems as in claim 4, said inlet and outlet ports extending laterally from said valve connector.

6. A precharged receiver drier of the type adapted for fitting in automobile air conditioning systems as in claim 5, said valve connector including swivel nut means engaging said valve connector port and said valve connector so as to compress said valve connector and said plunger valve with respect to said housing, while axially depressing said induction tube bottom end beneath said bottom seal.

7. A precharged receiver drier of the type adapted for fitting in automobile air conditioning systems as in claim 1, said valve connector including a transparent sight glass top and said float including a moisture indicating means at its top and visible through said sight glass.

8. A precharged receiver drier of the type adapted for fitting in automobile air conditioning systems as in claim 7, said plunger valve including at its bottom end a retainer supporting said float within said plunger and above said induction tube.

* * * * *